Oct. 26, 1965   B. H. TINGLEY   3,214,093
CARRIAGE CONTROL FOR CALCULATING MACHINE
Original Filed May 12, 1954   18 Sheets-Sheet 8

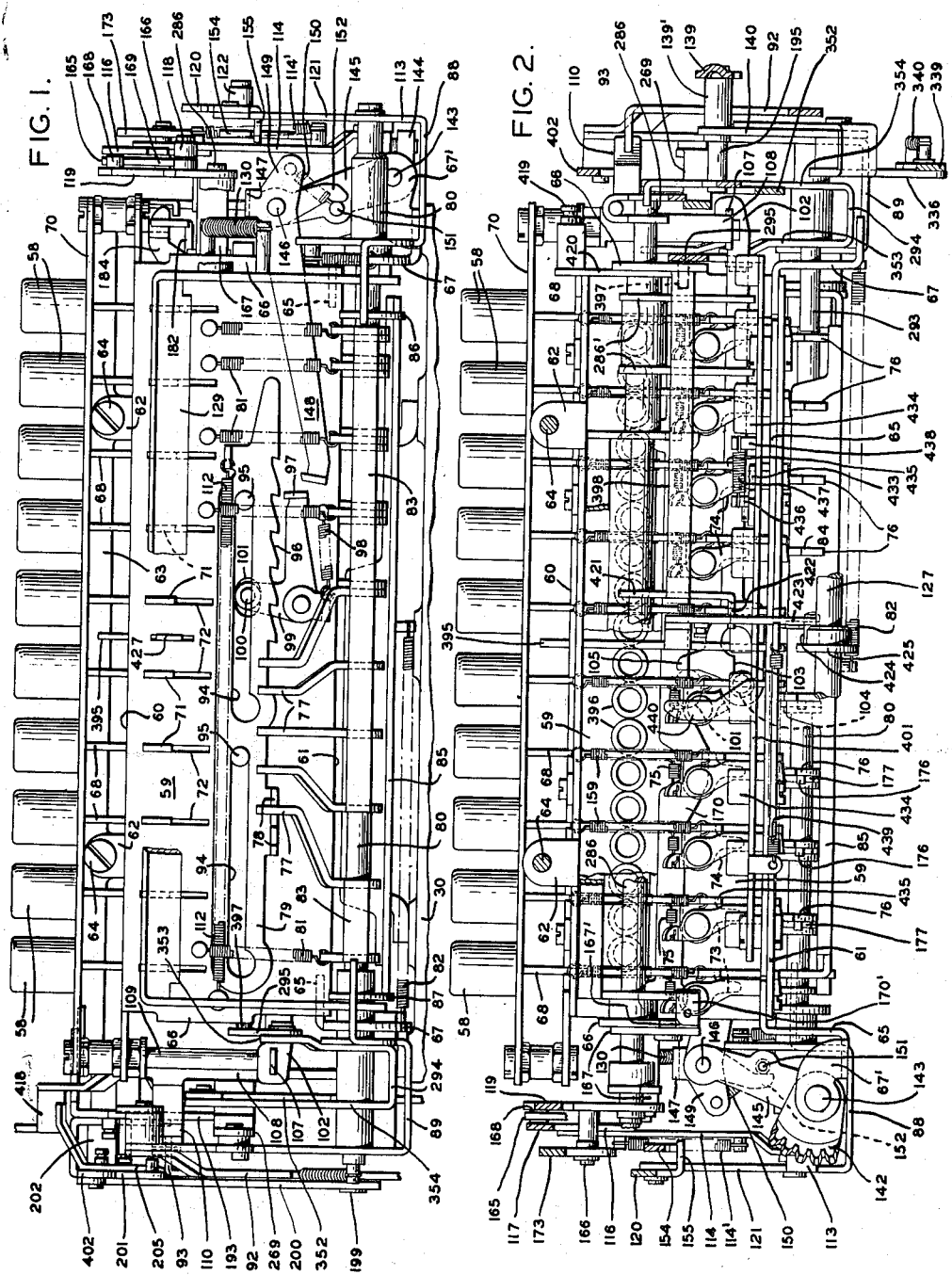

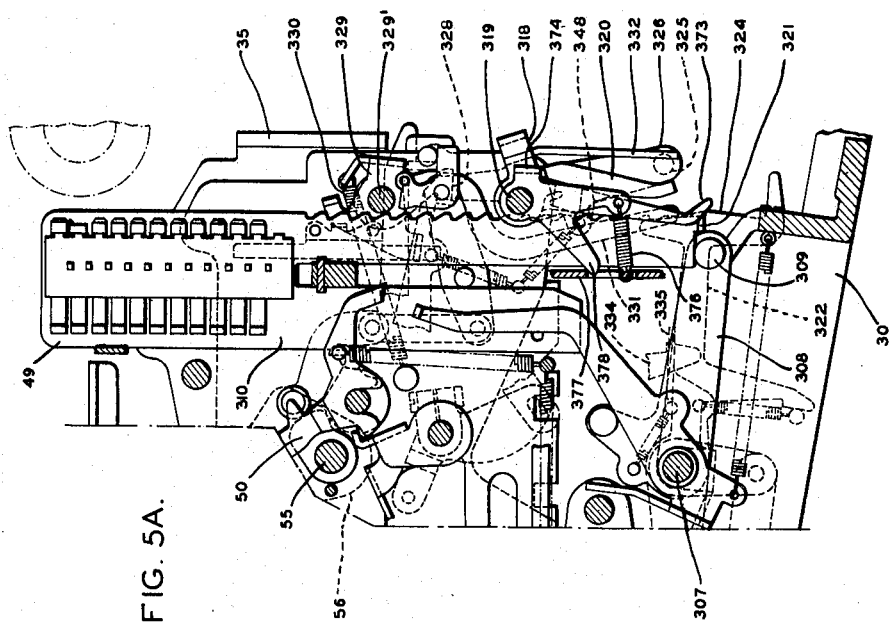

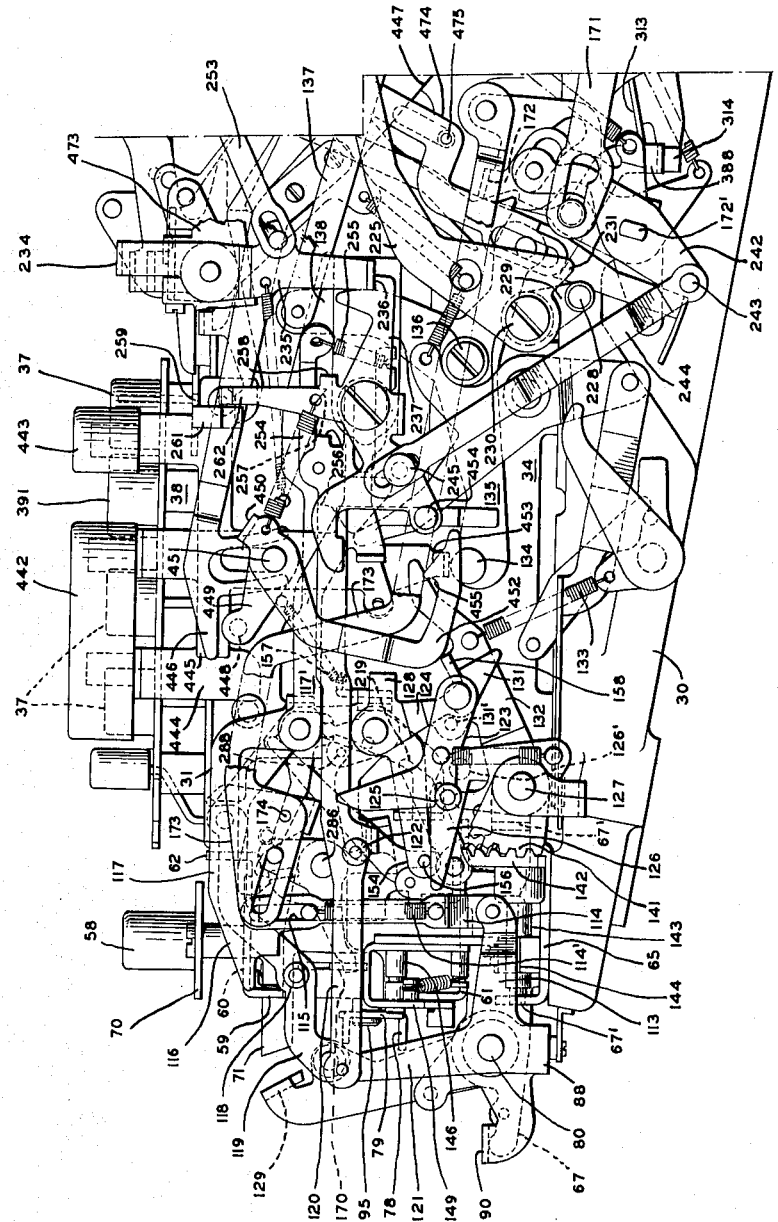

Oct. 26, 1965    B. H. TINGLEY    3,214,093
CARRIAGE CONTROL FOR CALCULATING MACHINE
Original Filed May 12, 1954    18 Sheets-Sheet 11

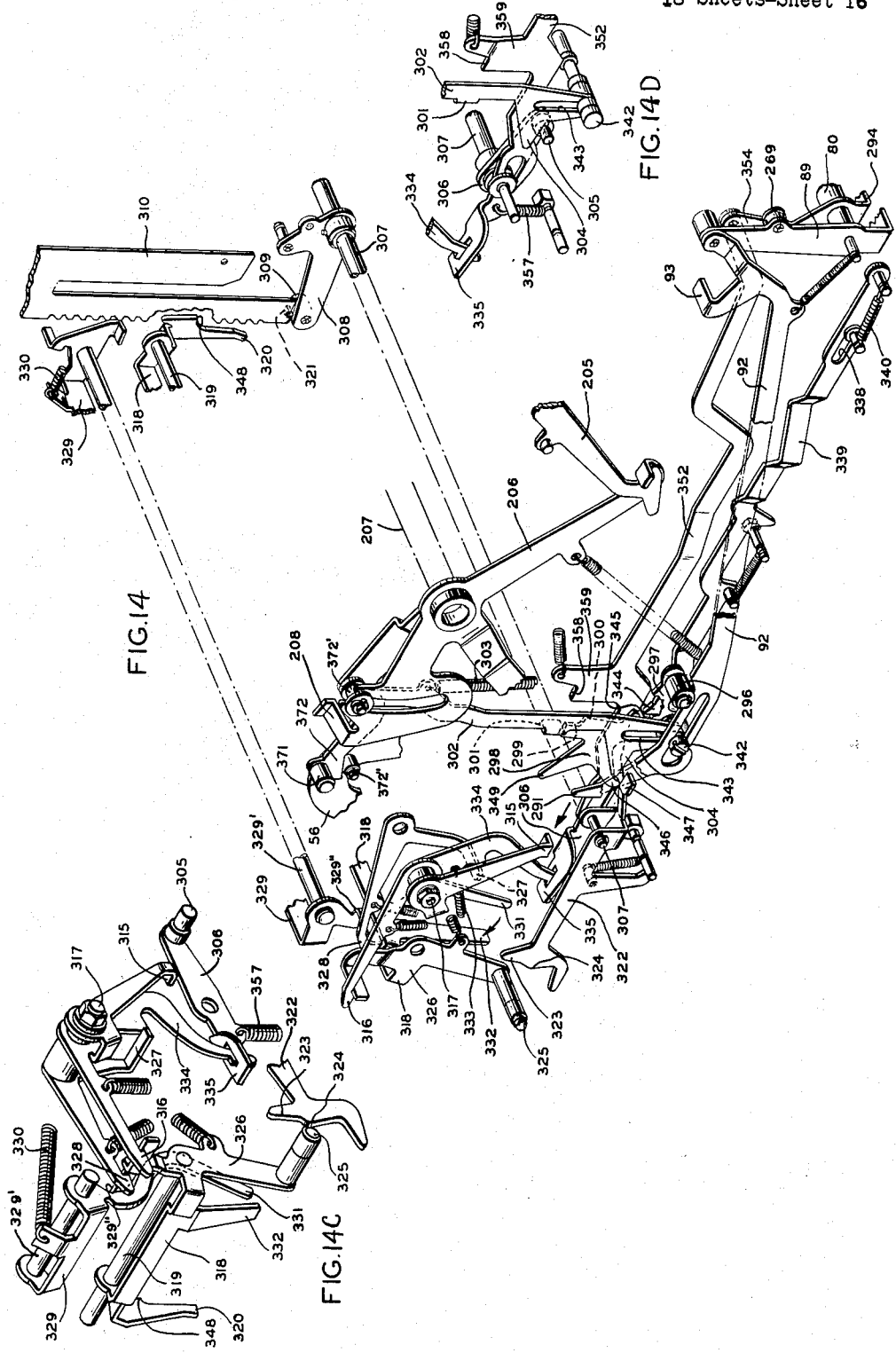

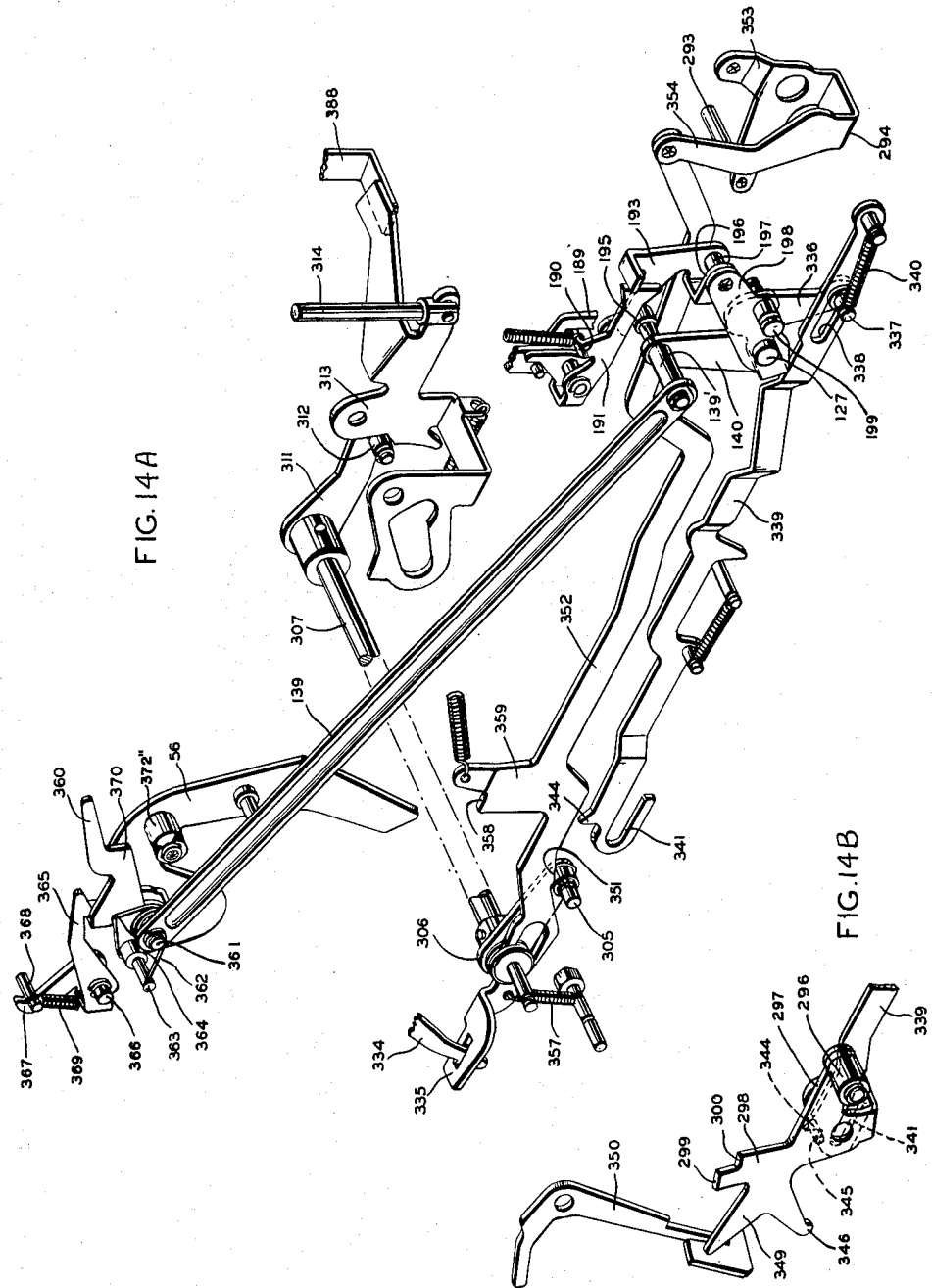

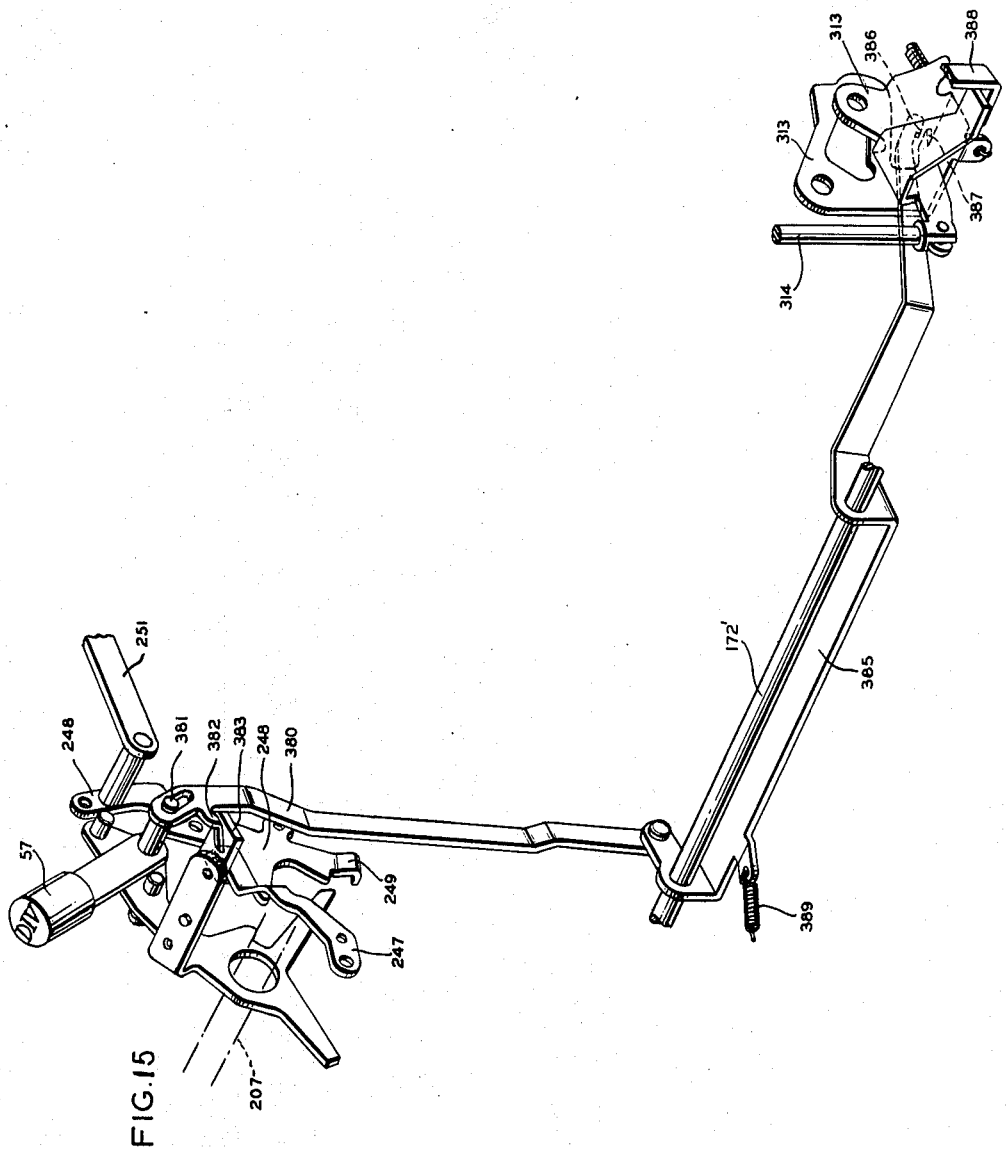

United States Patent Office 3,214,093
Patented Oct. 26, 1965

3,214,093
CARRIAGE CONTROL FOR CALCULATING MACHINE
Bruce Harrison Tingley, Pine City, N.Y., assignor, by mesne assignments, to Sperry Rand Corporation, New York, N.Y., a corporation of Delaware
Application Sept. 27, 1960, Ser. No. 58,814, which is a division of application Ser. No. 429,277, May 12, 1954. Divided and this application Nov. 13, 1962, Ser. No. 241,460
2 Claims. (Cl. 235—60)

This invention relates to new and useful improvements in pin carriage controls for calculating machines and has particular reference to improvements in the ten-key keyset type of calculator; being a division of my co-pending application Serial No. 58,814, filed September 27, 1960, now Patent No. 3,135,462, dated June 2, 1964, which application, in turn, is a division of my co-pending application Serial No. 429,277, filed May 12, 1954, now Patent No. 2,984,411, dated May 16, 1961.

The particular machine wherein this invention is embodied is an improvement over the machines disclosed in U.S. patents to Walter W. Landsiedel 2,203,336; 2,229,980; 2,237,881; 2,255,622; 2,688,439 and 2,726,037 in his name as follows:

It is more directly an improvement over Patents Nos. 2,688,439 and 2,726,037, more especially the latter which shows a calculator adapted to perform multiplication by a short cut method.

In the Patent 2,726,037 provision was made for short cut multiplication wherein the multiplicand was entered in the usual fashion and spaced in accordance with the number of digits in the multiplier. Then a short cut key was depressed, after which the multiply lever was pushed rearwardly and held for the proper number of cycles for each digit of the multiplier. As before, the machine would cycle through a blank and total stroke and print the product. The multiplicand and the first multiplier digit were printed at the end of cycling of the first digit. Subsequent multiplier digits were printed at the end of their respective series of cycles.

To facilitate the operation a dial was provided which indicates the successive cycles, so that the multiply lever could be released at the proper time.

The parent application, now Patent No. 2,984,411, is directed to the provision of mechanism to eliminate the dial and the lever altogether, and to provide a series of multiplier keys in addition to the regular keyboard so that after the multiplicand is entered and properly spaced it is merely necessary to press the desired multiplier key corresponding to the multiplier digit being entered into the machine, and the machine will take over and automatically cycle the proper number of times and then automatically take a total and print the product. There are no dials to watch or levers to hold and release. Just press down the proper key for the successive digits to be cycled.

The parent application S.N. 58,814 is directed to the provision of improved mechanism for the printing of multiplier and quotient digit symbols in response to selective actuation of multiplier keys.

The present invention is directed to the provision of improved latch mechanism for the control of the pin carriage.

The preferred form of the invention is shown in the accompanying drawing with the cover casing removed, and in which—

FIG. 1 is a front elevation of the multiplier keyboard;

FIG. 2 is a rear elevation of the multiplier keyboard removed from the machine;

Figure 4:
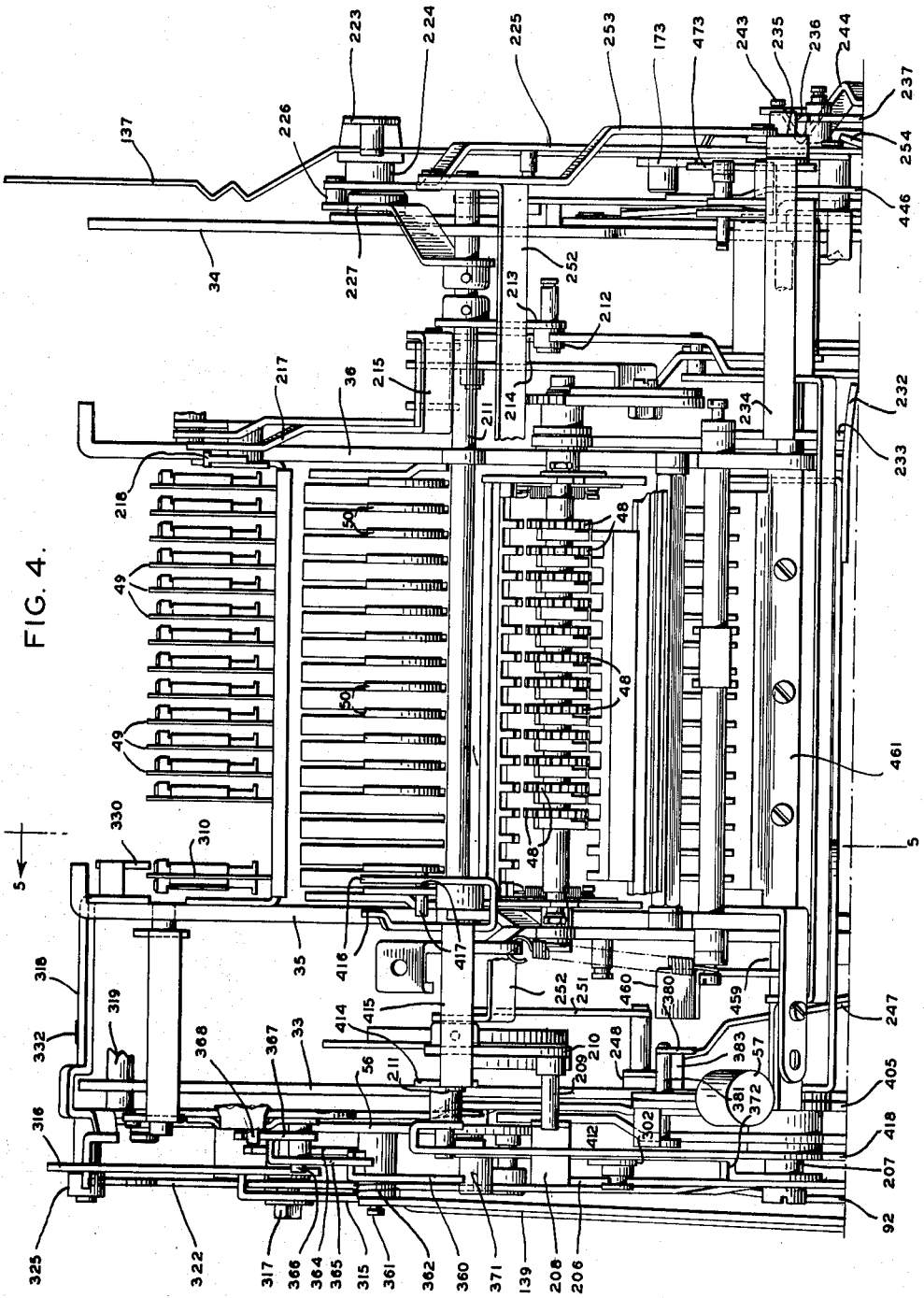
Figure 4A:
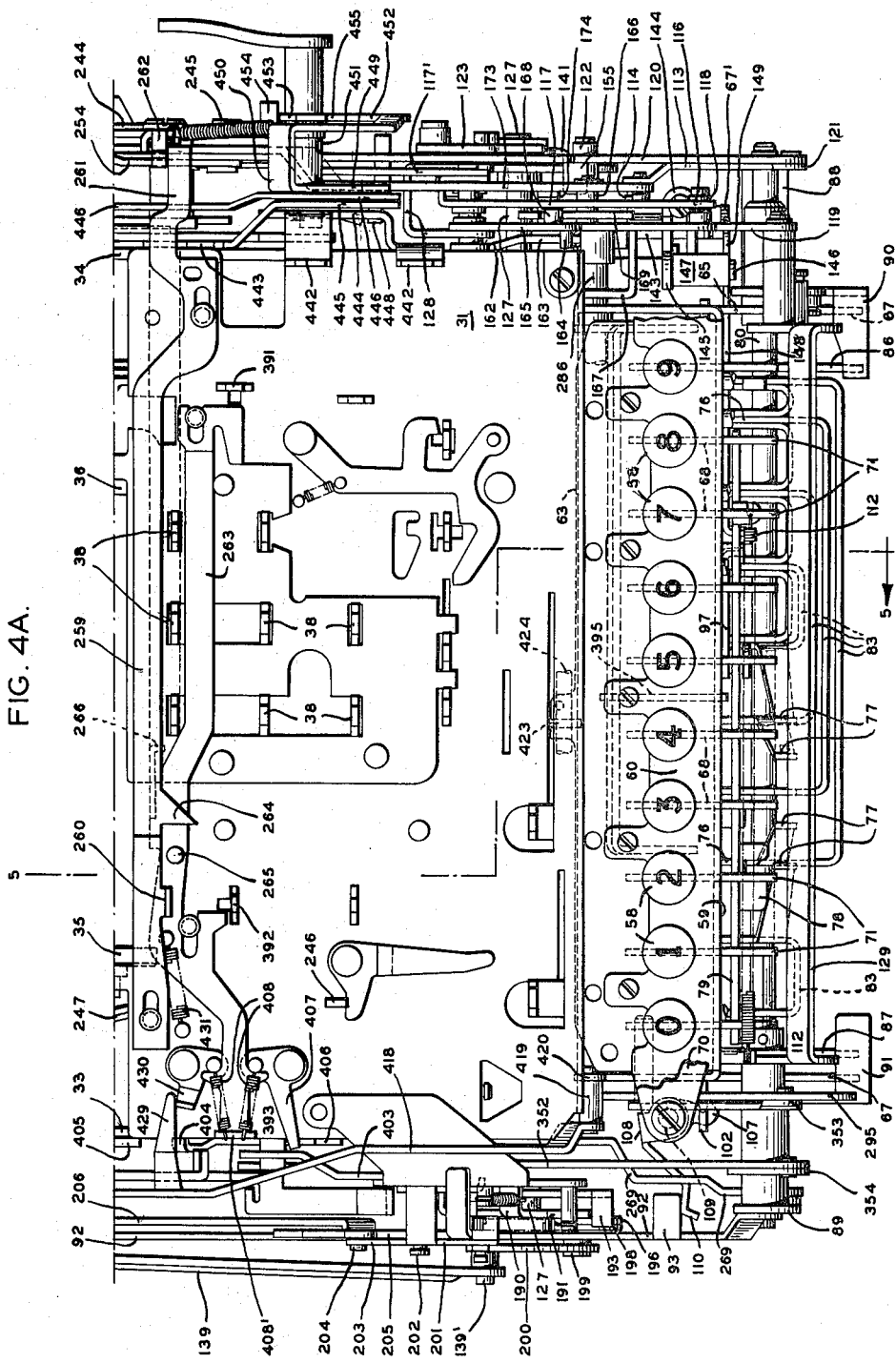
Figure 5:
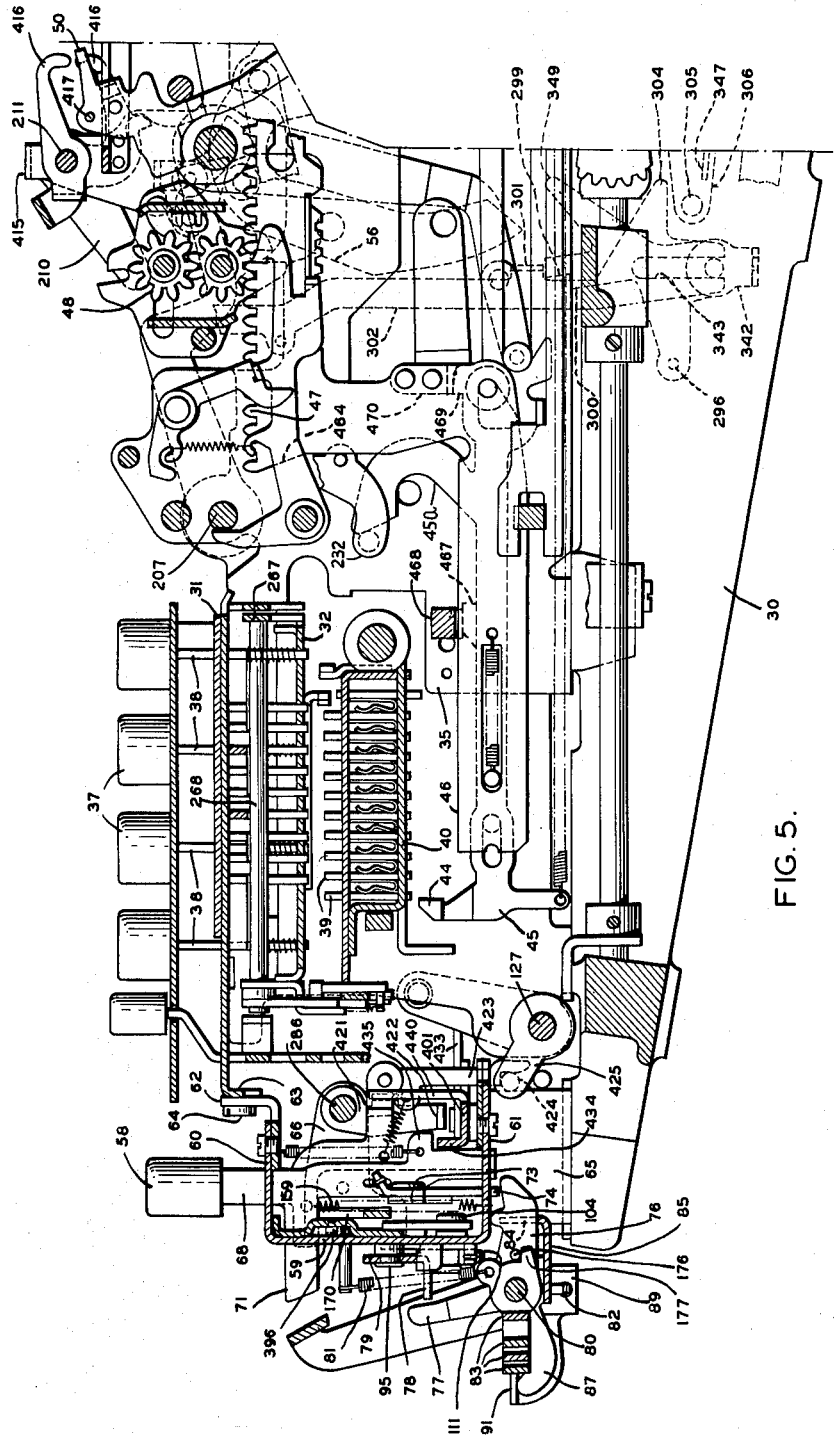
Figure 6:
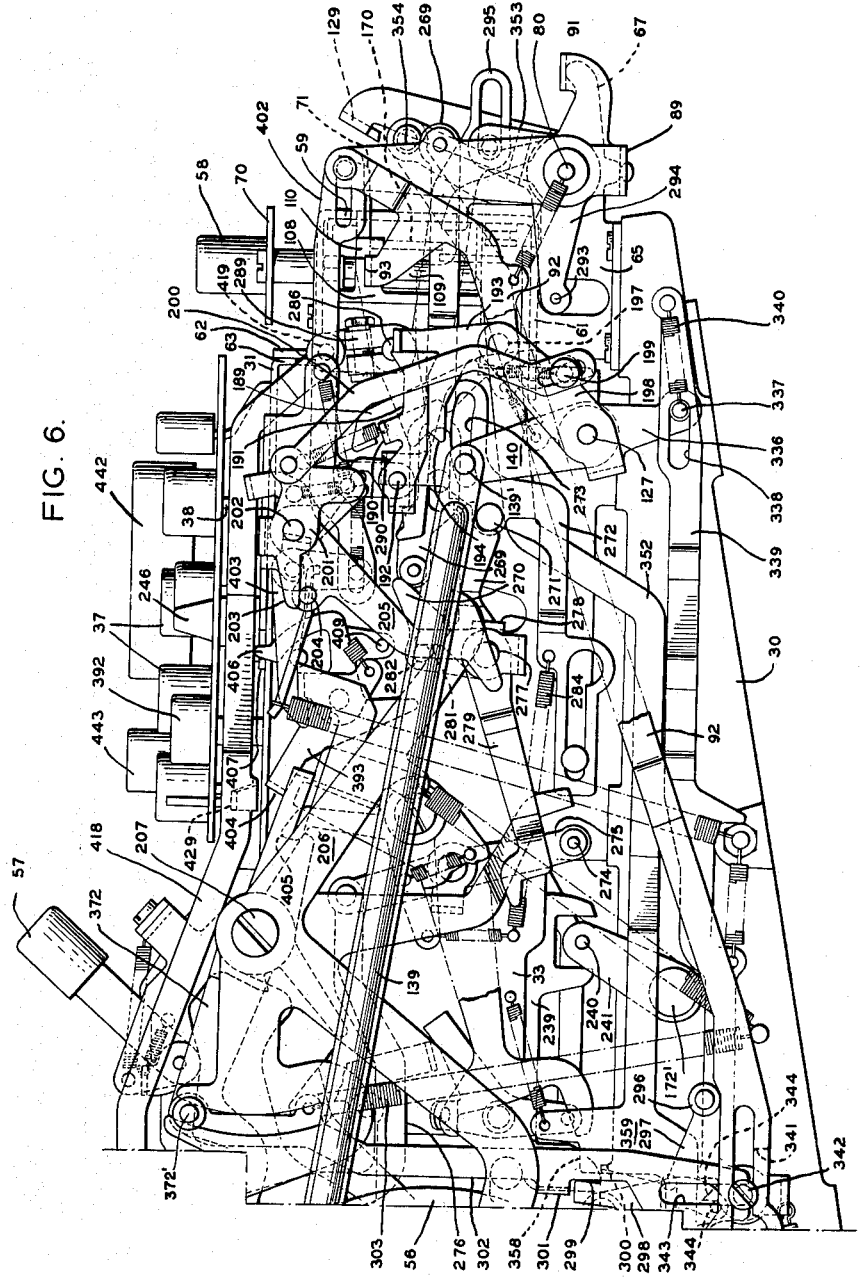
Figure 6A:
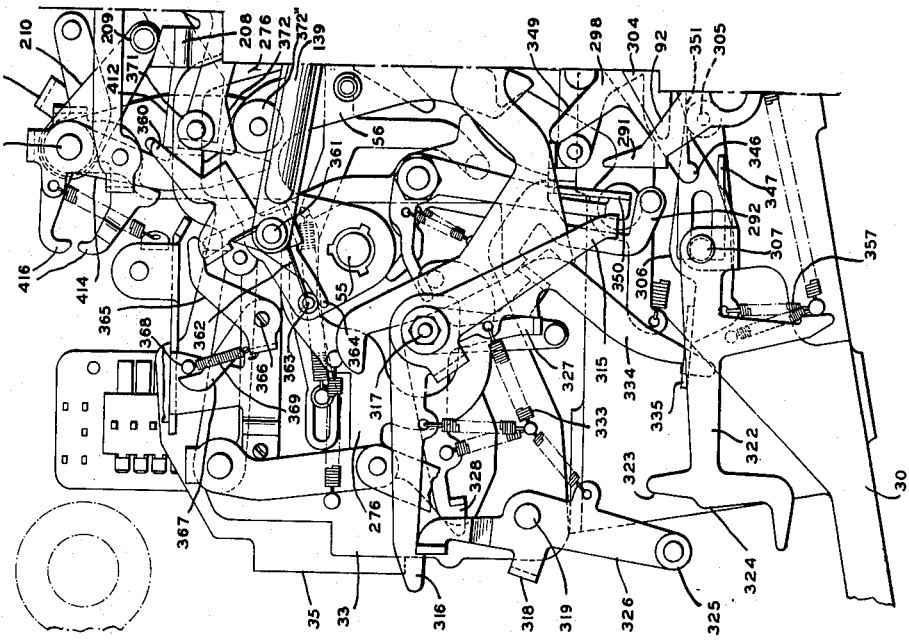
Figure 7A:
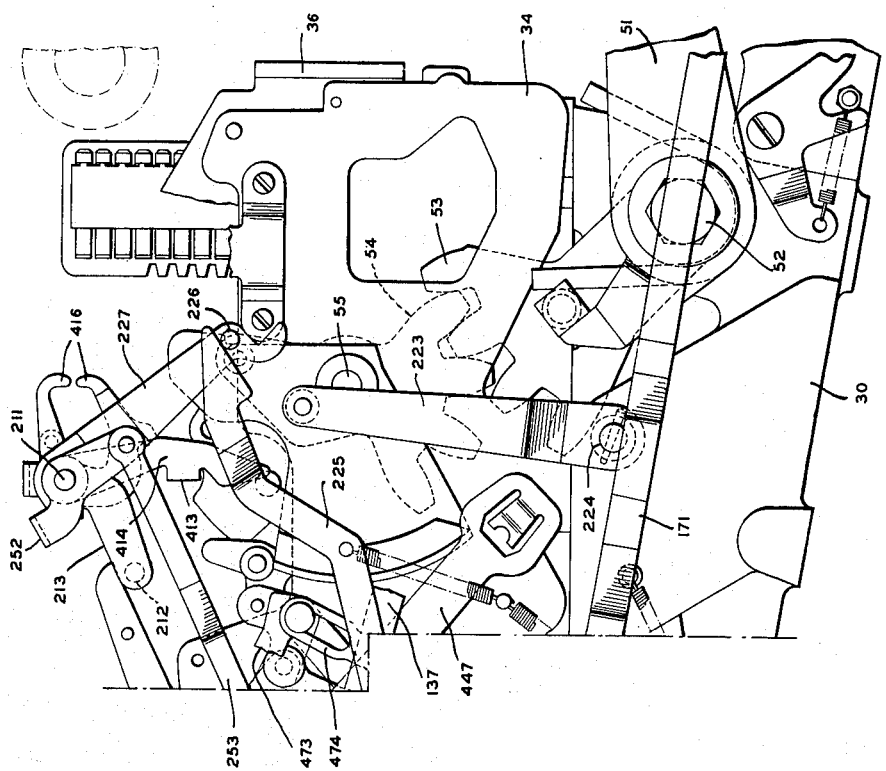
Figure 8:
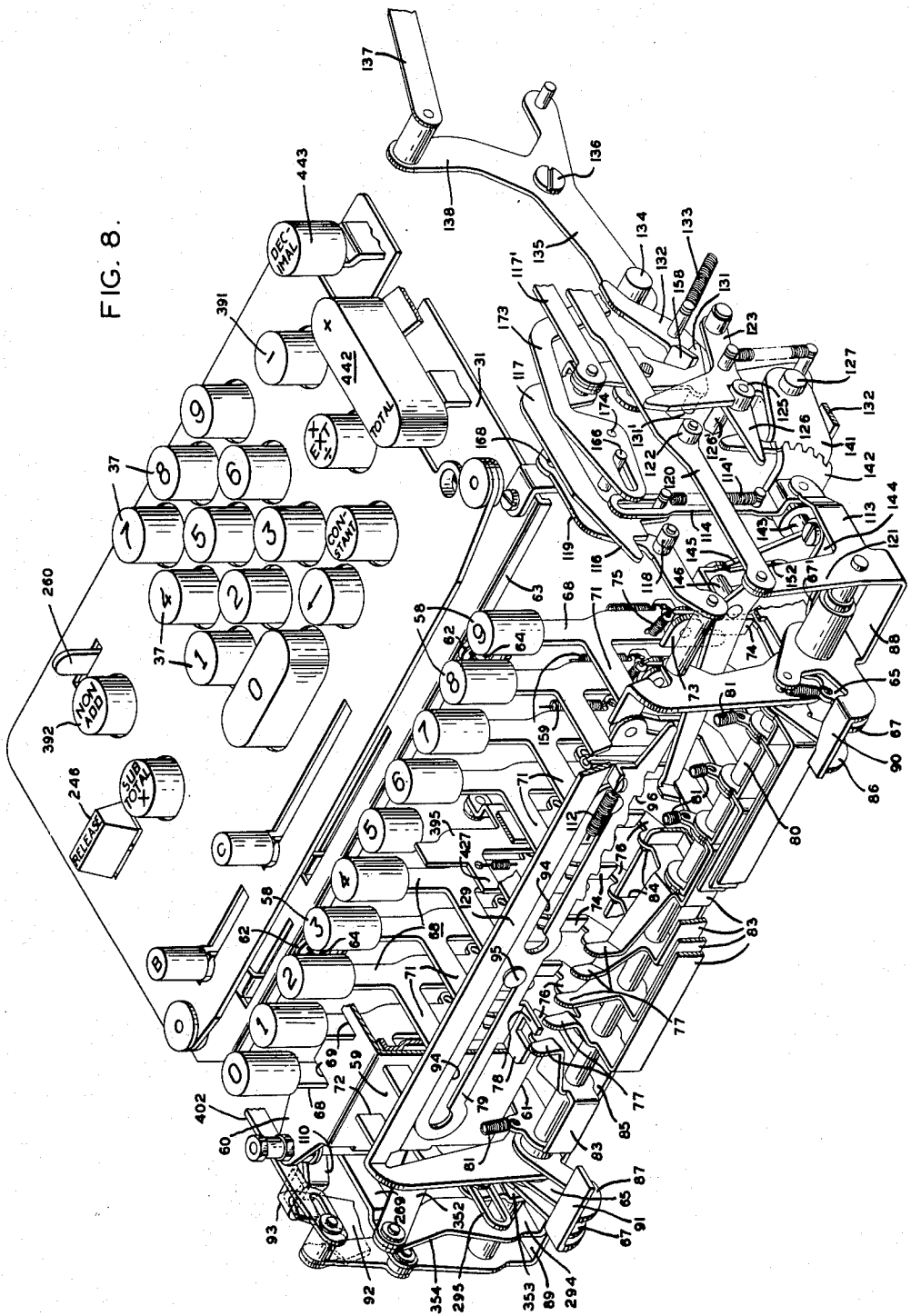
Figures 9, 9A:
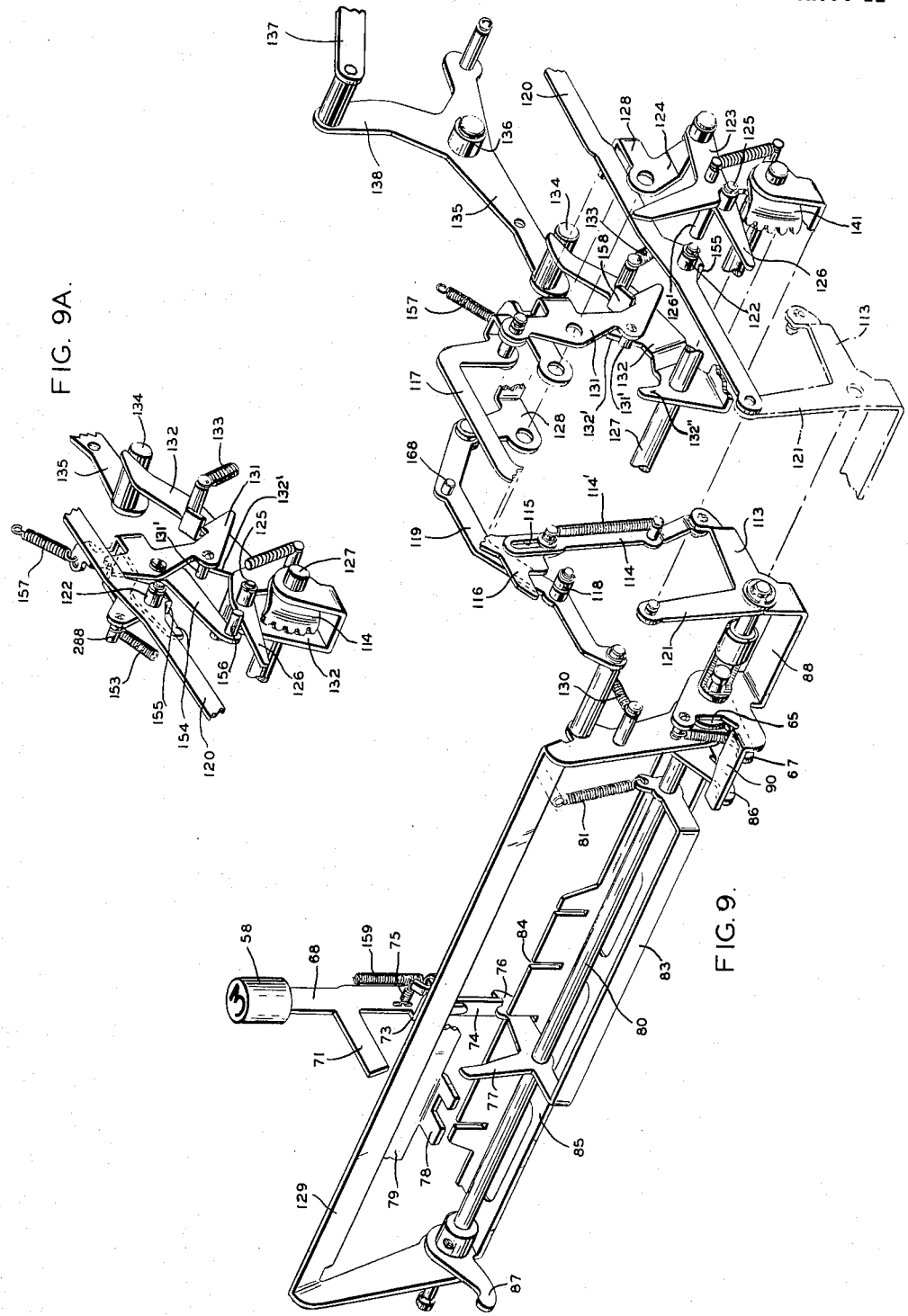
Figure 10:
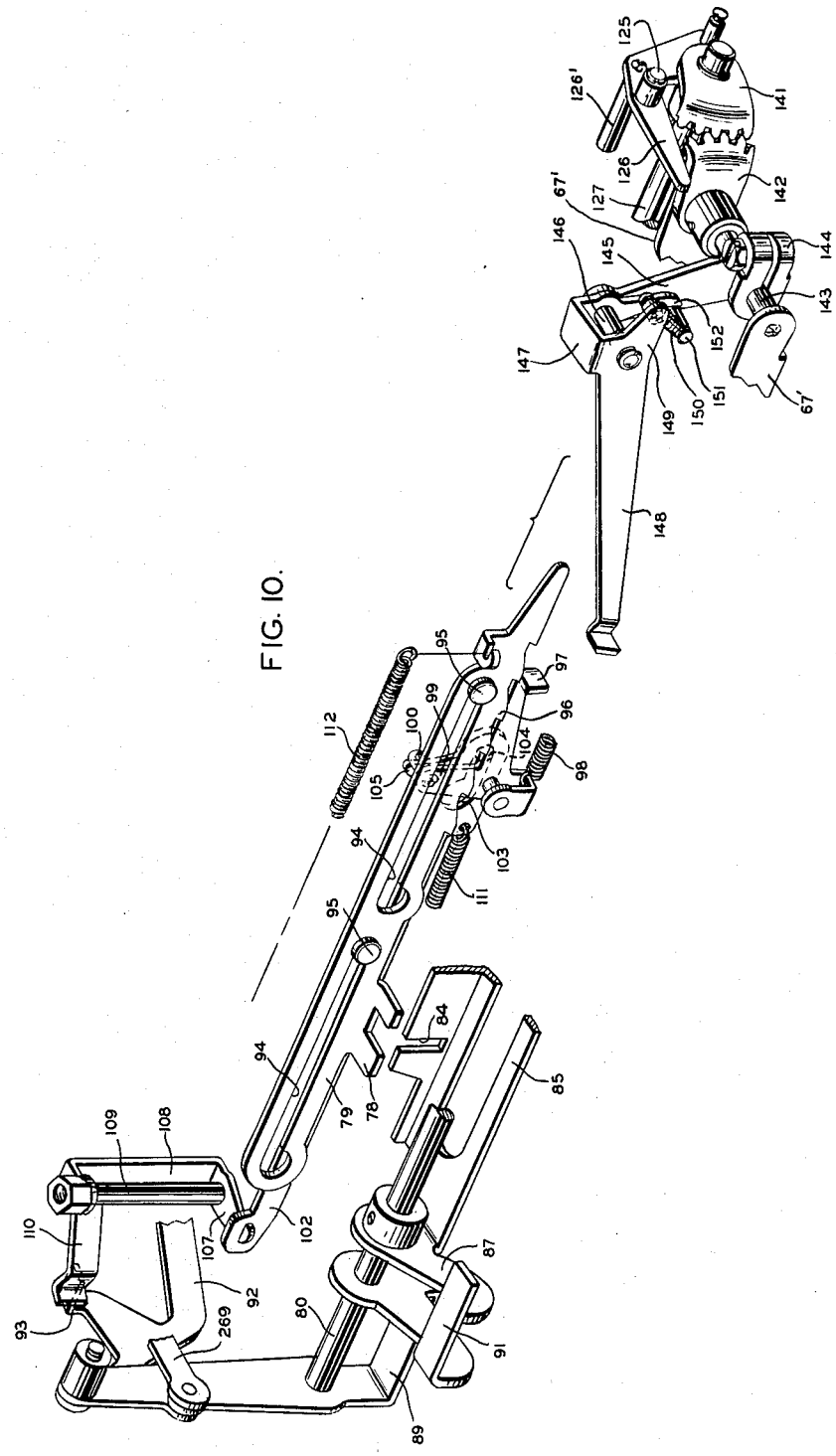
Figure 11:
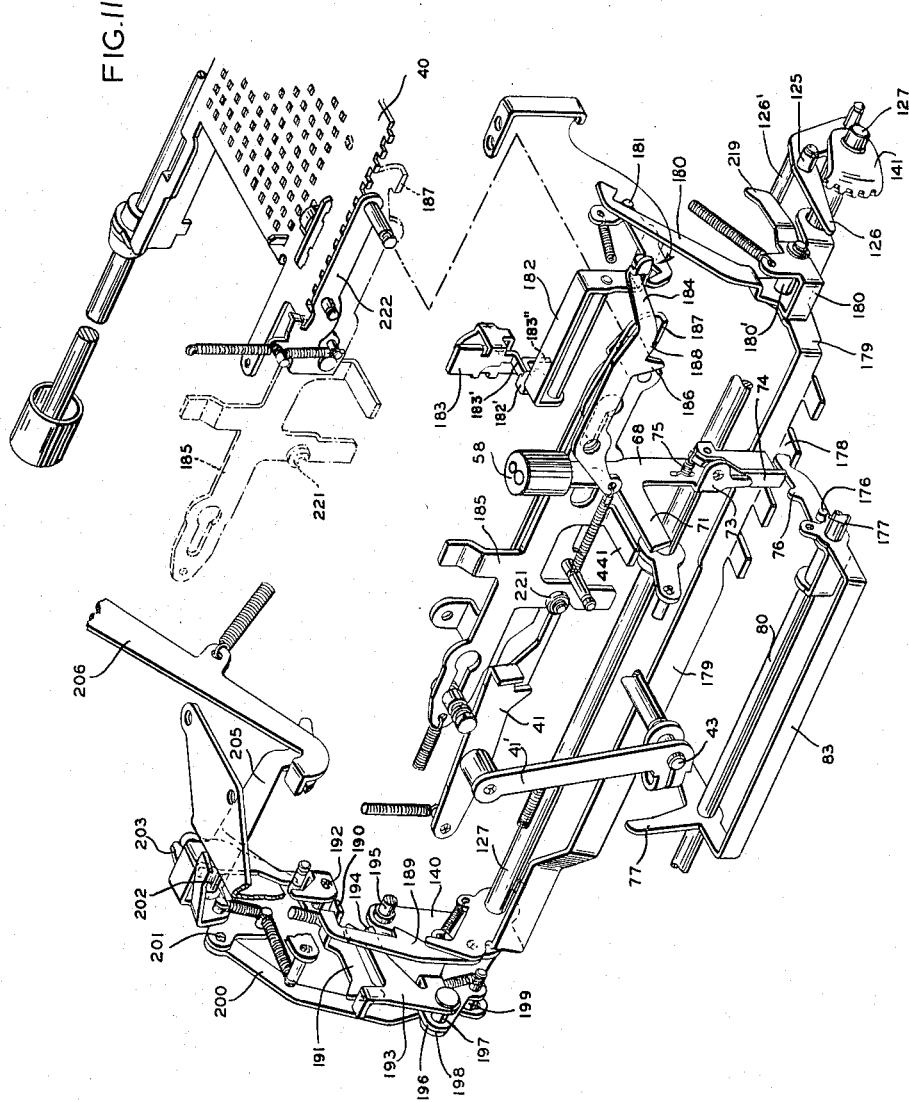
Figure 12:
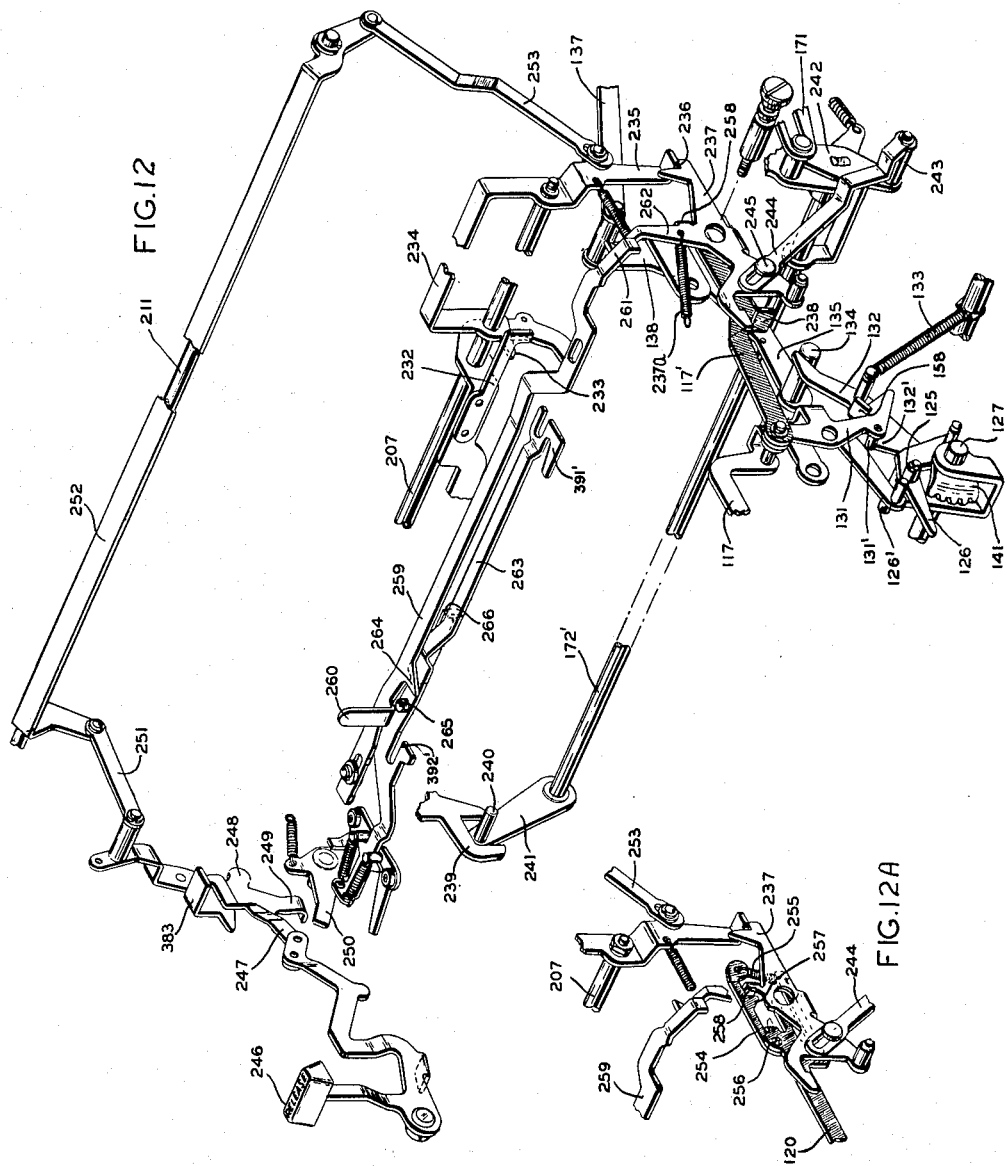
Figure 13:
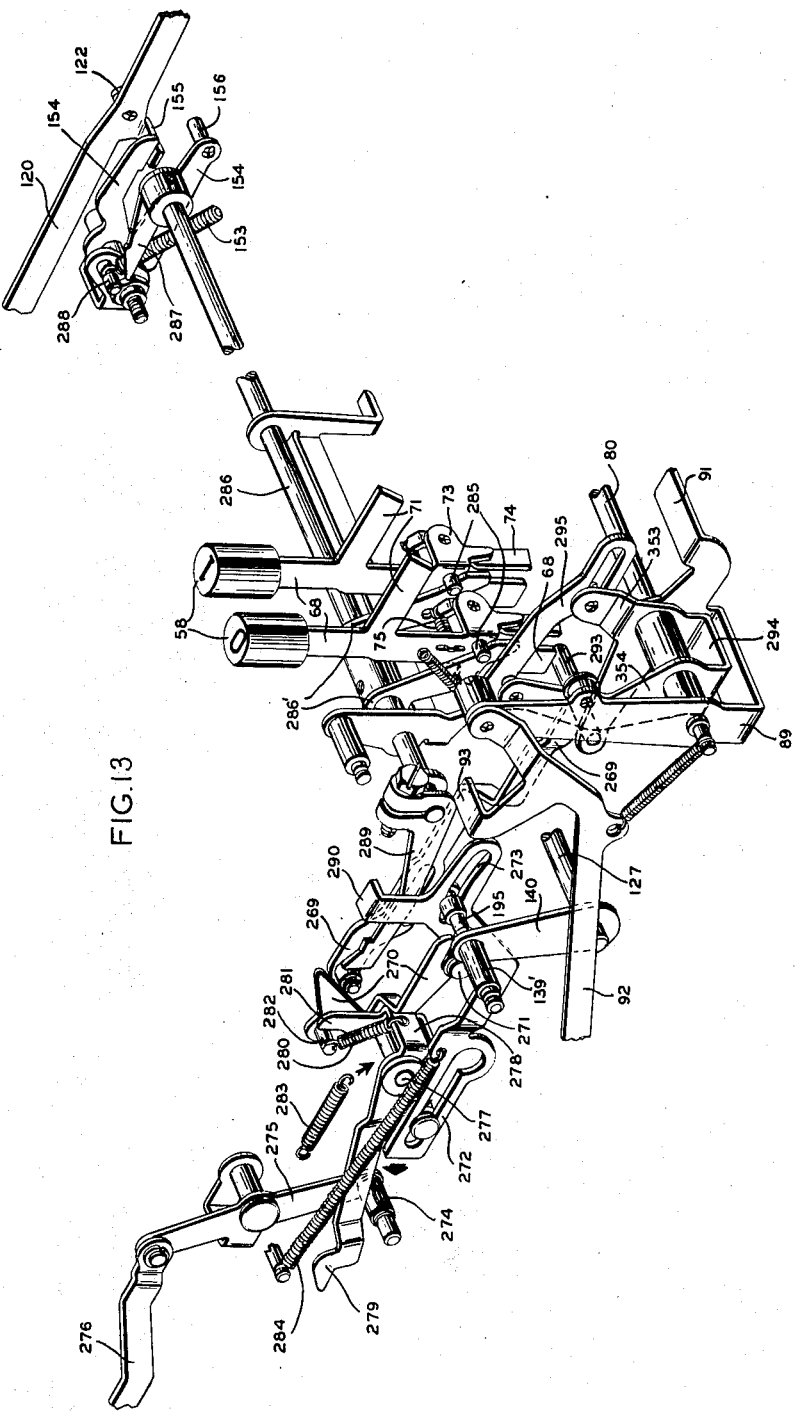

FIGS. 4 and 4A taken together constitute a plan view of the machine with the casing and the keyboard removed, but with the multiplier keyboard in position;

FIGS. 5 and 5A taken together constitute a vertical longitudinal section taken approximately on the line 5—5 of FIGS. 4 and 4A;

FIGS. 6 and 6A taken together constitute a left side elevation of the machine;

FIGS. 7 and 7A taken together constitute a right side elevation of the machine;

FIG. 8 is a partial perspective view of the front end of the machine showing the main keyboard and the multiplier keyboard;

FIG. 9 is a perspective view of certain parts having to do with the operation of the "two" through "five" keys with some portions of it shown in exploded relation;

FIG. 9A is a detail perspective showing some of the parts of FIG. 9 in their normal relation;

FIG. 10 is an enlarged perspective of an operating slide and associated parts;

FIG. 11 is an exploded perspective of mechanism in short cut multiplication particularly the escapement mechanism and the non-print control mechanism;

FIG. 12 is a perspective of mechanism involved in automatic blank stroke and total taking operations;

FIG. 12A is a detail of the mechanism of FIG. 12;

FIG. 13 is a perspective of mechanism involved when the "zero" or "one" key are depressed, with some parts exploded and some omitted;

FIG. 14 is a perspective of the mechanism for operating the quotient rack with some parts exploded;

FIG. 14A is a perspective of other parts of the mechanism of FIG. 14 with some parts exploded and some others omitted;

FIG. 14B is a perspective detail of FIG. 14 showing mechanism to backspace and step up the M and Q rack five positions;

FIG. 14C is a partial rear perspective of the latches and bails employed in connection with the blocking and holding of the M and Q rack;

FIG. 14D is a detail perspective drawn out of FIG. 14 to avoid confusion;

FIG. 15 is a perspective of a mechanism for latching the repeat shaft arm during division.

*Former general structure*

Figure 3:
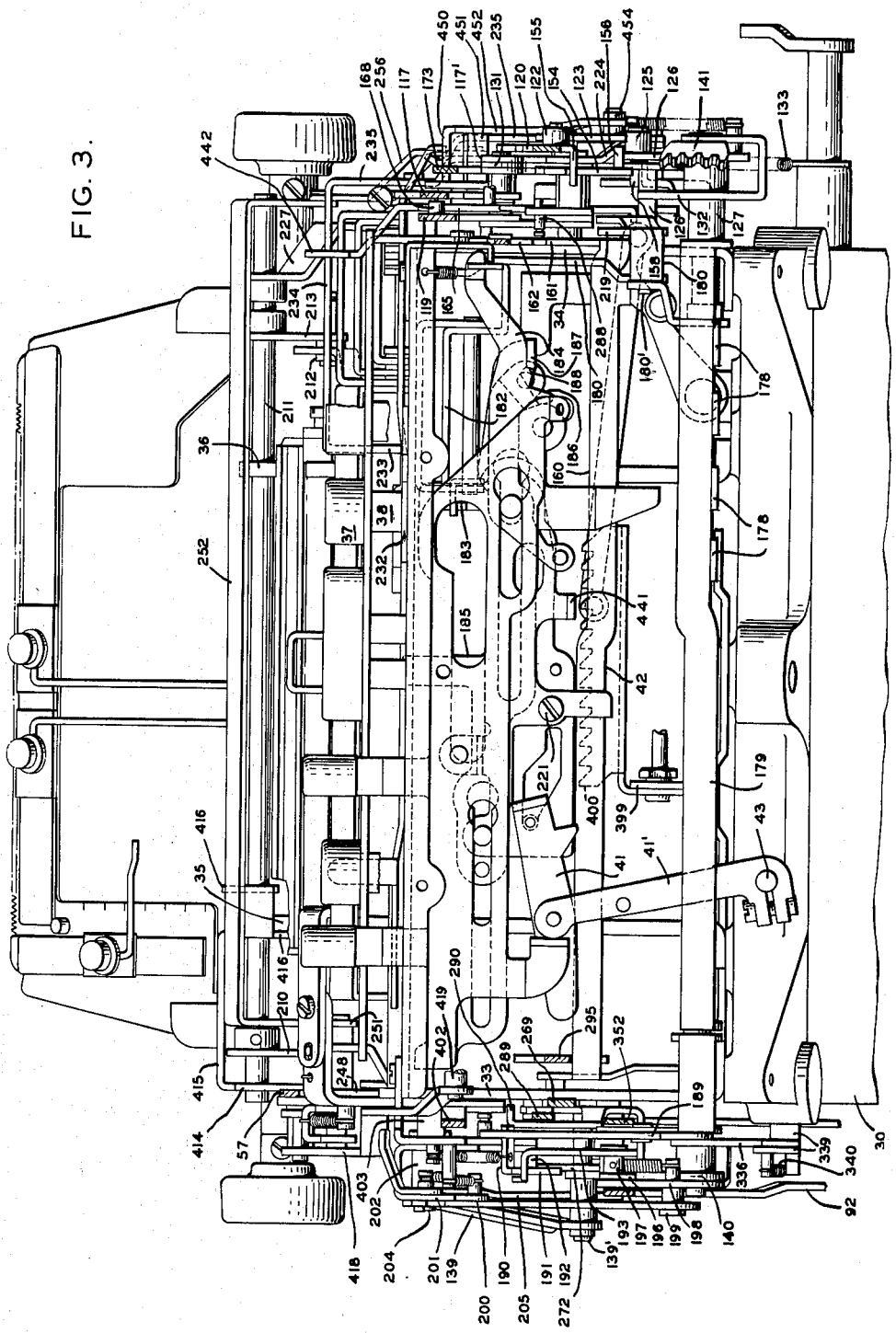
FIG. 3 is a front elevation of the machine with the multiplier keyboard removed, and with certain parts of the sides shown in section.

The machine on which the herein improvements are imposed is of the type shown in the cited references above, especially that shown in Patent 2,726,037 and involves a base plate 30, upper and lower keyboard plates 31 and 32, outer vertical plates 33 and 34 and inner vertical plates 35 and 36 suitably braced (see FIGS. 4 and 5). The regular digit keys 37 have stems 38 which are depressed to set pins 39 on a pin carriage 40 which is escaped step by step in the usual manner by means not shown herein, but shown in FIG. 6 of Patent 2,726,037 above as spring 57 and escapement mechanism 58 for carriage 50 on rails 93 and described at col. 8, lines 46 through 54 thereof. The pin carriage 40 (FIG. 5) is backspaced by means of pawl 41 (FIG. 3) cooperating with backspace rack 42 in the usual manner through operation of arm 41' and backspace shaft 43. The set pins 39 are, when set, disposed in the path of lips 44 on slides 45 cooperating with adding racks 46, the teeth 47 of which, mesh with the accumulater wheels 48 (FIG. 5). These racks also mesh with pinions (not shown) to elevate the type racks 49 (FIGS. 4 and 5). The printing hammers 50 are fired generally in the manner as set forth in FIG. 1 of Patent 2,203,336. The machine is driven by an electric motor (not shown) but generally as shown in FIG. 6 of Patent 2,229,980 above, and this action oscillates bellcrank 51 (FIG. 7A) pivoted at 52 and having a gear sector 53 meshing with a similar sector 54 fixed to main shaft 55. On the opposite end of the main shaft 55 is the backspace cam 56 (FIG. 6A) described and shown as part 194 (FIG. 3 of Patent 2,726,037). There is also shown the division lever of key 57 (FIG. 6) and its associated elements which are in the main the same as in the above Patent 2,726,037 (FIG. 3 thereof). The general structure and operation of the present machine is in many respects the same as the patent above, and any changes and alternations thereof will be taken up in connection with the description of the structure and operation of the improvements which constitute this invention, and which are in one or another manner related to the regular elements.

Structure and operation of improvements

It should be recalled that in the machine of the invention, instead of pushing a multiply lever and watching a dial, it is merely necessary, after the multiplicand has been properly entered in the pin carriage, to press the proper multiplier digit key to start the machine and multiply by that digit. If that is the only multiplier digit involved in the operation, the machine will automatically proceed to take a total. Otherwise, the next digit key is depressed until the last multiplication has taken place, whereupon the machine will proceed to take and print the total. This last operation involves two cycles. When the first multiplier digit is cycled, on the last cycle of this series of multiplication cycles, the digit involved and the multiplicand are printed. Further multiplication cycles for other digits of the multiplier will involve only the printing of the multiplier digit until the printing of the total or product as above stated.

A main feature of the present invention resides in a multiplier keyboard which is attached to the front of the machine and supports a plurality of multiplier digit keys 58 representing digit values from 0 to 9. These are supported on a C shaped frame having a vertical wall 59 (FIG. 5), top and bottom rearwardly extending walls 60 and 61. The rear of the top wall 60 is secured to an angle member having apertured ears 62 permitting the frame to be fastened by means of screws 64 to a cross bar 63 on the front of the main body of the machine. Secured to the bottom wall 61 is a member 65 having dependent L-shaped ends apertured on their base portions and screwed to the base plate 30 of the machine (FIG. 6). The opposite vertical edges of the wall 59 have rearwardly extending flange plates 66 (FIGS. 1, 2 and 5). The L-shaped members 65 have forwardly extending flanges 67 acting as journals for certain shafts and rods later mentioned.

The multiplier keys 58 have stems 68 which are guided in slots 69 (FIG. 8) in the top and bottom walls 60 and 61 of the unit frame. The enlarged heads of the keys are guides in openings (not shown) in a cross plate 70 (FIG. 2) supported above and parallel to the top wall 60 of the frame of the unit. The stems 68 have forwardly projecting fingers 71 extending through slots 72 in the front wall 59 of the C frame to prevent angular turning of the stems (FIG. 1). The lower portion of the key stems 68 having laterally turned ears 73 (FIG. 11) to which are pivoted pawls 74 to the upper end of which are connected springs 75 fastened to the stems 68. In general the depression of a "two" to "five" key (FIG. 9) will cause the pawl 74 to bear down on one arm 76 of a bellcrank, the other arm 77 of which acts as a block arm and, when a key is depressed, is disposed in the path of movement of forwardly extending spaced ears 78 of a step-by-step slide member 79. The arm 76 is positioned in a comb plate 85 which is spring urged to the right by a spring 82 (FIG. 2). When an ear 78 contacts the block arm 77, which is disposed in its path, it moves the arm 77 and the comb plate 85 which are pivotally and slidably mounted on cross rod 80, to the right, thus releasing its cooperating arm 76 from the pawl 74. The arm 76 then rocks counterclockwise (FIG. 9) under the influence of springs 81 out of contact with ears 78 and is moved to the right to normal position under the influence of spring 82 acting on comb-plate 35 (FIG. 2). After the ear 78 contacts the arm 77 and releases it, the key stem 68 does not restore until the next stroke, as will later be seen. Therefore, when the block arm 77 moves to the left (FIG. 9) the pawl 74 will yield to the left thus removing pressure from the key stem. The key stem is now free to restore when unlatched. It will be seen from FIGS. 4A and 8 that bails 83 are connected respectively between the arms 76 associated with the keys 2 and 9, the keys 3 and 8, the keys 4 and 7, the keys 0 and 1, and the keys 5 and 6. It can be perceived from FIGS. 1 and 8 that there are ten arms 76, but only five block arms 77. Therefore, it is equally obvious that the operation keys 0 and 1 will set up a common block arm; the operation of key 9 will set up the block arm associated with key 2; the operation of key 8 will set up the block arm associated with key 3; the operation of key 7 will set up the block arm associated with key 4; and the operation of key 6 will set up the block arm associated with key 5. As will later be apparent this is for the purpose of setting up multiplication by the complementary or short cut method.

Mechanical operation when keys 2 to 5 are operated

As a multiply key, such as for the digit "three" (FIGS. 9 and 9A) is depressed, the pawl 74, pivoted to the key stem 68, contacts and depresses arm 76 and causes its block arm 77 to be positioned in the path of ears 78 on slide 79. The arm 76 also lies in a slot 84 in a comb plate 85 which is also pivotally mounted on rod 80. There are five slots 84 in the comb plate 85 to receive arms 76 related to keys 1, 2, 3, 4 and 5. At its ends the comb plate has forwardly extending arms 86 and 87 which respectively are adapted to operate the motor drive control bellcrank 88 (FIG. 9) and the multiply non-print bellcrank 89 (FIG. 10) through the respective offset arms 90 and 91 as said comb is rocked by the depression of a key (FIGS. 9 and 13).

As the multiply non-print bail 89 rotates clockwise (FIG. 10) it will position the multiply mechanism operating slide 92 rearward (FIG. 10). The slide 92 has an ear 93 thereon. Slidably attached to the front of wall (FIG. 1) by slots 94 and studs 95 (FIGS. 1, 8 and 10) is the key stem bellcrank operating slide 79. The right hand lower edge of slide 79 has teeth 96 engageable by the end of a latch pawl 97 pivoted on the wall 59 and normally urged into engaging relation with the teeth by a spring 98. An upright arm 99 of the pawl 97 has a stud 100 extending rearwardly through a hole 101 in wall 59. Back of wall 59 is an elongate link 102 slotted at 103 to ride on a stud 104 (FIG. 10) fastened to the back of wall 59. This link at its right end has an upright finger 105 which is adapted to engage the stud 100 to move it to the right and depress the pawl 97 against the action of spring 98 fastened at one end to pawl 97 and at the other to the front face of wall 59. One end of link 102 is slotted to receive the end of arm 107 of a bail 108 rotatable on rod 109 which is supported from upper wall 60 and cross plate 70 (FIG. 1). This bail 108 also has an extension 110 at its upper end which normally lies in front of ear 93 on link 92. When the link 92 is moved rearward the ear follows and bail 108 is turned by reason of the pull of a spring 111 (FIG. 10) fastened at one end to link 102 and at the other end to the back of wall 59. It will thus be seen that upon continued movement of link 92 to the rear, extension 110 will be rotated by spring 111 acting on slide 102, thus permitting arm 105 to follow, relieving the stud 100 of pressure from arm 105 thus allowing pawl 97 to be swung by spring 98 into place to engage the teeth of the slide 79. When the link 92 moves forward again the reverse operation takes place and the pawl 97 is disengaged and the slide 79 is snapped back to normal by the spring 112 (FIG. 1) fastened at one end to the slide and at the other to the front face of the wall 59. How the slide 79 is advanced step-by-step will now be set forth.

When the motor drive bellcrank 88 is rocked clockwise (FIGS. 9 and 9A) an arm 113 thereon moves down and pulls down a link 114 having a pin and slot connection 115 with a nose 116 on the front end of a link 117. The nose 116 is connected by spring 114' to the link 114. This disposes the nose 116 in the path of a roller 118 on a link 119 whereby link 117 is moved rearwardly when the link 119 moves rearwardly. As bellcrank 88 rocks clockwise (FIG. 9) a link 120 attached to the upper end of its arm 121 is moved rearwardly and carries a roller 122 rearwardly. This roller 122 contacts a control arm 123 pivoted to the lower end of key stem release arm 124 and lifts said arm 123 from engagement with roller 125 on a gear arm 126 fastened to the universal drive shaft 127. The release of arm 124, dependent from bail 128, will permit the clockwise movement of key lock bail 129 through the action of link 119 and spring 130 fastened to a frame of the machine. This bail 129 will then move in over the extension 71 of the depressed key and hold it down until released. As link 119 moves rearward its roller 118, engaging depressed nose 116, will move link 117 rearwardly. The rear end of this link 117 is attached to the upper end of a motor control latch lever 131 which is rocked clockwise (FIG. 9) to release motor drive control arm 132 which, by spring 133, is rocked clockwise and its end presses on stud 134 on one arm of a three arm bellcrank 135 pivoted to the frame of the machine at 136, to rock this crank counterclockwise (FIG. 9) to start the motor through arm 138 and link 137 (FIG. 7). This crank 135 and link 137 are the same as crank 54 and link 45 shown in FIG. 5 of Patent 2,237,881 above, and operate to start the motor in the manner described therein.

In order to keep the latch 131 from engaging the lip 158 on the motor control arm 132 until the end of a multiplying operation and/or a total taking operation, the following operation takes place: As the gear arm 126 rotates counterclockwise (FIG. 9) the stud 126' thereon encounters the front upright extension 132" on the arm 132 and lifts this arm. As the arm 132 is lifted, a raised portion 132' on the upper edge of arm 132 encounters a stud 131' on the lower end of the latch 131 to move it to the front away from the lip 158 on the arm 132. As the arm 126 returns, the stud 126' releases the extension 132' of arm 132 and the spring 133 pulls the motor control arm downwardly, so that this arm may start another cycle of operation.

As long as the latch lever 131 is held forward by the rearward position of the link 117, the latch 131 cannot engage the lip 158 on the motor arm 132. However, when the link 117 is moved forwardly the spring 157 will move the latch member 131 rearwardly to be in a position to engage with the lip 158. However, if the mechanism has to go through further strokes the raised portion 132' on the arm 132 does move the latch back to permit the further operation. When the motor strokes are ended then the arm 132 dropping from its high position will be caught by the latch.

As the motor operates, the backspace cam 56 will turn clockwise (FIG. 14A). To this cam is connected a link 139 extending to an elongate stud 139' on an arm 140 fixed on the universal drive shaft 127. The oscillation of this drive shaft 127 will rock the bevel gear 141 on its end and this gear meshes with a similar gear 142 (FIGS. 2 and 10) fixed to a stub shaft 143 journalled between spaced laterally extending flanges 67' of the multiplier unit keyboard frame. A yoke 144 fixed to stub shaft 143 has an upright arm 145 with a lateral stud 146 on which is pivoted a bail 147 having an extended actuating pawl 148 adapted to engage the teeth 96 on the slide 79 and pull it to the right, as viewed in FIG. 10. As the stub shaft 143 rocks clockwise in FIG. 10, the arm 145 so moves and lifts the pawl 148 to engage the teeth 96. The pawl 148 has a tail piece 149 to which is connected a spring 150 the other end of which is connected to a pin 151 fixed on the arm 145. The bail 147 has a tail 152 which limits the pin 151. As the arm 145 restores to normal the pawl 148 is lowered out of engagement with the teeth 96. Thus the slide is moved one space to the right on each machine operation, in which position it will be latched by the pawl 97.

In respect to keys 2 to 9, inclusive, the ears 78 on slide 79 contact block arms 77 on the next to the last multiply stroke and releases the arm 76 from the key stem pawl 74 as above mentioned. This allows the key stem comb 85 to restore and in turn permits the non-print bellcrank 89 to restore. The bellcrank 88 is prevented from restoring at this time because a spring 153 (FIG. 9A) will pull down cyclically operated latch 154 to latch over an ear 155 on link 120 to prevent the return of the link 120. This latching is effected on every forward stroke of the main shaft since the arm 126 (FIG. 9A) moves thus downward at that time and through pin 156 permits latch 154 to drop and engage the ear 155. This prevents the motor drive control arm 132 from being latched by the motor control latch 131. Control arm 123 will also be held up by contact with roller 122 on link 120, thus remaining above roller 125 on gear arm 126 and preventing the multiply key from being unlatched by key stem latch 129.

It was stated that comb 85 was restored on the forward stroke of the next to the last multiplying cycle of the machine. At this time latch 154 is holding link 120 rearwardly, preventing it from restoring. However, on the return stroke of this cycle the gear arm 126 will rotate clockwise and lift pin 156 on latch 154 to release latch from ear 155 and allow link 120 to restore. This will restore bellcrank 88 and as it does link 114 will rise and lift nose 116 from behind roller 118, allowing spring 157 to move the motor control latch 131 to the rear to enable it to latch under lip 158 on the motor control arm 132 at the end of the following main shaft stroke. On the last forward stroke of the multiplying cycles as gear arm 126 on the universal drive shaft 127 moves downward, the control arm 123 will drop behind the roller 125 on said arm 126 and on the return stroke the roller 125 will drive the arm 123 to the rear and through arm 124 rock bail 128 counterclockwise, thus driving link 119 forward and unlatching the multiply key 58 which will tend to restore under the tension of its own spring 159 (FIG. 9). The machine will print and backspace on this stroke, as disclosed in Patent 2,726,037 above.

*Restoration of carriage when multiplying by 1*

The purpose of pawl 360 (FIG. 14A), which is pivoted to the stud 361 which in turn connects link 139 to the backspace cam 56, is to pick up and restore the link 302 immediately on the first return stroke to enable the stop section to restore when multiplying by "1," if a significant figure is in the units column or the release key is used. The pawl 360 is urged clockwise by a yield spring 362 wrapped around the stud and is connected to the pawl at one end and to the stud 363 on the backspace cam 56 at the other end. The pawl 360 has a rear dependent finger 364 (FIGS. 6A and 14A) limiting against the stud 363 on the backspace cam 56. The pawl is held in its raised position as shown in FIG. 14A by a latch arm 365 pivoted on a pin 366 on the frame plate 33 and arm 365 has a limiting finger 367 limiting against pin 368 on the frame plate 33. A spring 369 connected at one end to pin 368 and at the other to the latch arm 365 urges the arm into latching position with the pawl 360. The operation of pawl 360 is as follows: As the backspace cam 56 rotates clockwise (FIG. 14) the pawl 360 will move down with it. The step 370 of pawl 360 will swing around and under roll 371 (FIG. 14) on an arm 372 pivoted on shaft 207 against the resistance of yield spring 362. Reference to FIG. 14A will show that when the backspace cam 56 moves downwardly it will carry the pawl 360 with it, and this pawl will be swung initially counterclockwise because it is temporarily held by the pawl 365. This will cause the outer end of pawl 360 to bear against the top of roll 371 and the swinging movement of the pawl 360 will cause the step 370 thereon to lie under the roll 371 so that it will push up on the roll 371 when the cam 56 returns to normal. The lever 372 has a stud 372' thereon which is connected to the upper end of the link 302. It will be noted that the cam 56 has a stud 372' thereon which, in the normal position of said cam shown in FIG. 14, will support the outer end of lever 372. On the return stroke the step 370 will pick up the roll 371 and restore the link 302 at the very beginning of the return stroke. This will cause nose 304 of link 302 to release stud 305 on arm 306 (FIG. 14C) so that shaft 307 and multiply repeat bail will restore, thus lowering the rod 314 permitting the pin carriage to restore if it is not prevented from doing so by other means.

Repeat shaft arm latch

This mechanism has been added to prevent premature restoring of the pin carriage 40 during division, and consists of a latch operating link 380 (FIG. 15), slotted to receive a stud 381 on the arm of the division key 57 and has a lip 382 resting just above an ear 383 laterally extending from the release latch plate 248 pivoted to a frame plate such as 33 (FIG. 4). The other end of link 380 (FIG. 20) is connected to a latch bail 385 which pivots on the feature key latch shaft 172'. A hooked latch finger 386 extending from the latch bail 385 is adapted to engage with a rear lip 387 on the repeat shaft bail 313.

When the division key 57 is operated the stud 381 will be moved down allowing spring 389 to rock latch bail 385 clockwise, moving link 380 downward. This will lower latch hook 386 into engagement with lip 387 on the repeat shaft bail 313 when the inner link 388 supported from the right arm (not shown) of the division shaft 207 (FIG. 6) as usual is raised during a division operation. This latching of hook 386 with lip 387 on repeat shaft bail 313 prevents rod 314 from dropping, in turn, preventing the usual restoring link (not shown) from restoring the pin carriage during subtraction operations which form part of a division problem. The restoring link has been omitted for the sake of brevity, but is the equivalent of and functions as restoring link 164 in FIG. 7 of aforementioned Patent No. 2,726,037, wherein, as set forth at columns 16 and 17, rod 163 is the equivalent of the rod 314 (FIG. 15) herein. Rod 163 (Patent No. 2,726,037) raises restoring link 164 upward into inoperative position, wherein, when it is driven to the left, it rides over bevel gear sector 333, without affecting the gear sector 333 or pin carriage (see Patent No. 2,726,037 column 25, lines 31 to 54). When the division key 57 restores in the usual manner stud 381 will raise link 380 which in turn will rock the latch bail 385 counterclockwise to unlatch the latch hook 386 from lip 387. This will permit rod 314 to drop and allow the usual aforementioned restoring link (link 164 in Patent No. 2,726,037) to restore the pin carriage. The inner link 388 functions in the manner set forth in Patent 2,688,439 above mentioned and described on col. 13, bottom thereof, with particular reference to parts 193, 390, 399, and 409 set forth in FIGS. 3 and 11 thereof.

Operation of the release key 246 (FIG. 14) during division will rock latch plate 248 through the extension arm 247 on the release key. This rocking movement will lift ear 383 (FIG. 15) which through lip 382 will raise link 380 and, as described above, will normalize the latch bail 385 unlatching the repeat shaft bail 313. The repeat shaft bail is then free to restore, through link 388 when the right division shaft arm (not shown) is unlatched. This arm is not shown herein for purposes of clarity, but is shown in Patent 2,237,881 (FIG. 5) as element 284 and also in Patent 2,688,439 (FIG. 3) as part 386. The division operations of this machine are otherwise substantially unchanged from those set forth in the previously mentioned applications and patents.

While there is above described but one embodiment of the invention, it is possible to produce still other embodiments without departure from the inventive concept above disclosed, and it is, therefore, desired that only such limitations shall be imposed on the appended claims as are stated therein.

I claim:
1. In a machine of the class described having a division key, a pin carriage, means for moving said pin carriage from a first position to a second position, mechanism for restoring said pin carriage to said first position, preventing means operative for actuating said restoring means to a position preventing the restoration of said carriage; means actuatable to cause said preventing means to actuate said restoring means to said preventing position, and means connected to said key and operable by depression of said key to latch said preventing means in operated position.

2. In a machine of the class described having a division key, a pin carriage, means for moving said pin carriage from a first position to a second position, means for restoring said pin carriage to said first position, and a push rod movable to a position actuating said restoring means to a position for preventing the restoration of said carriage; a rockable member on which said push rod is disposed, a latch finger adapted to engage said rockable member to hold said push rod in said actuating position, a bail on which said latch finger is mounted, a spring biasing said bail, a link having one end pivotably connected to said bail, said link having its other end connected to said division key such that depression of said key causes said spring to urge of said latch finger into latching engagement with said rockable member.

References Cited by the Examiner

UNITED STATES PATENTS

| | | | |
|---|---|---|---|
| 2,688,439 | 9/54 | Landsiedel | 235—60 |
| 2,695,134 | 11/54 | Sundstrand | 235—60 |
| 2,726,037 | 12/55 | Landsiedel | 235—60 |
| 2,905,382 | 9/59 | Carnacina | 235—205.4 |

LEO SMILOW, *Primary Examiner.*